United States Patent
Merrick et al.

(10) Patent No.: US 6,636,219 B2
(45) Date of Patent: *Oct. 21, 2003

(54) SYSTEM AND METHOD FOR AUTOMATIC ANIMATION GENERATION

(75) Inventors: Richard Merrick, McKinney, TX (US); Michael Thenhaus, Plano, TX (US); Wesley Bell, Plano, TX (US); Mark Zartler, Garland, TX (US)

(73) Assignee: Learn.Com, Inc., Sunrise, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/031,488

(22) Filed: Feb. 26, 1998

(65) Prior Publication Data

US 2002/0089504 A1 Jul. 11, 2002

(51) Int. Cl.7 ................................................ G06T 15/70
(52) U.S. Cl. ........................................ 345/473; 704/276
(58) Field of Search ......................... 345/473; 704/275, 704/276, 260

(56) References Cited

U.S. PATENT DOCUMENTS 5,111,409 A * 5/1992 Gasper et al. ............... 395/152
5,630,017 A * 5/1997 Gasper et al. ............... 395/2.85
5,727,950 A * 3/1998 Coook et al. ................ 434/350
5,877,778 A * 3/1999 Dow et al. ................... 345/474
5,963,217 A   10/1999 Grayson et al.

OTHER PUBLICATIONS

Towns et al (Coherent Gestures, Locomotion, and Speech in Life–Like Padagogical Agents: Proceedings of the 1998 International conference on Intelligent User Interfaces: Jan. 1998).*

Waters et al (An Automatic Lip Synchronization Algorithm for Synthetic Faces—1994 ACM 0–89791–686–7/94/0010).*

Mikodocs Guide to HTML, Mikodocs Inc., www.idocs.com, 1997.*

* cited by examiner

Primary Examiner—Mano Padmanabhan
(74) Attorney, Agent, or Firm—Cooper & Dunham LLP

(57) ABSTRACT

The present invention provides an easy to use tool for preparing animated characters for use on the Internet. Requiring only limited user input and selection, the system of the present invention automatically choreographs and synchronizes reusable animation components with dialog streams. Once generated, the resulting choreography may be embedded into a hypertext markup language (HTML) web page with an appropriate audio player plug-in to deliver any number of animated dialogues with minimal wait time and minimal developer effort.

8 Claims, 5 Drawing Sheets

SYSTEM AND METHOD FOR AUTOMATIC ANIMATION GENERATION

BACKGROUND OF THE INVENTION

1. Field of the Invention

This invention relates generally to animation production and more specifically to methods and systems for automatically generating animation for use in connection with Internet web pages.

2. Background of the Invention

The Internet is enjoying more popularity than ever. With the number of users rising almost exponentially over the last few years, it is not surprising that a large majority of businesses have made the Internet a significant part of their overall marketing plan. In addition to the large number of "web surfers" who may come across advertising content, the Internet offers many advantages in terms of technological capabilities for advertising products and services. Current Internet technology permits advertisers to do many things which have heretofore been unavailable through any other known advertising medium.

One key benefit of Internet based advertising is the availability of real time interaction with the audience (i.e. the Internet user). For example, it is possible for web developers, working at the behest of advertisers, to script multiple dialogs, scenes, and/or interactions in connection with a web site such that a visitor to that site may be made to feel that the "advertisement" was produced specifically for his or her interests. In other words, based upon the particular HTML links and selections that a user follows or makes, respectively, a user will be presented with information of specific interest to that user. This is in contrast to, for example, a television commercial, where an advertiser produces a commercial of general interest to the universe of its potential customers.

A second major advantage available to Internet advertisers is the variety and richness of media available. Web sites may include information taking the form of plain text, still photographs, still animation, movies, spoken words, scrolling text, dynamic animation and music among others. A combination of these forms of information can create a powerful, enjoyable and lasting image in the mind of the potential customer.

One aspect of web site content that is becoming increasingly popular is dynamic animation. With this media format, an animated character may appear on the user's display, move around the display in a "lifelike" fashion, point to various objects or text on the screen and speak to the user. In most cases, when the character speaks to the user, the dialog is synchronized with lip movements representing the phonemes being spoken so that it appears that the words are actually emanating from the character's mouth. As can be imagined, dynamic animation can provide an interesting, informative and fun environment through which products and services may be advertised. By way of example, a company may include its "mascot" (e.g. an animal, persona, fictional character) in its web page content. In this way, the mascot can "walk around" the web page, speak to the user and use hand and other body movements to convey messages to the user.

Additionally, the mascot may point to specific items on the page, make movements and/or recite dialog based specifically and in real time upon user input. For example, in the case of a web site for the sale of automobiles, a user might click on the graphic of the particular model that interests him or her resulting in the display of a web page completely dedicated to that model. That page may also include the dynamic animation (probably including dialog) representing the company's mascot welcoming the user to the page concerning the particular model. Additionally, the advantages of the real time interaction may be effected such that the character, for example, describes and points to various features of the car based upon user input (e.g. the user points to a portion of the automobile graphic which is of interest).

While dynamic animation presents significant opportunities for advertising (as well as other applications) on the Internet, various implementation difficulties arise in connection with developing and revising content. First, the production of dynamic animation requires special skill not broadly available. Dynamic animation (also generally referred to as "choreography" herein) must generally be conceived and created by an individual having both artistic capabilities and a technical knowledge of the animation environment. The cost involved in having material choreographed is thus quite expensive both in terms of time and financial commitment.

A second difficulty arising in the creation of dynamic animation is the inherent inability to reuse such animation in significantly or even slightly different applications. For example, it is exceedingly difficult to reuse animation produced in accordance with a specific dialog with another dialog. In other words, it is a complex task to "re-purpose" choreography even after it is initially produced at great expense. Additionally, no tools which automate this task are known to the inventors herein. Thus, borrowing from the above example, if an automobile salesman animation was produced with specific dialog to recite and point to each of the features on the automobile as selected by the user, it would not be a simple task to use the same salesman character along with the same general class of body movements to add a discussion of a newly added automobile feature. On the contrary, it would heretofore be necessary to manually produce a new animation for synchronization with the new dialog.

Another problem arising in connection with the use of dynamic animation on the Internet results from network bandwidth limitations. With current technology and network traffic, it is difficult to deliver compelling and highly expressive animation over the Internet without downloading substantial information prior to execution of the animation. This can result in user frustration, substantial use of storage space and other undesirable effects resulting from the download process. Alternatively, the animation may be reduced to an acceptable size for real time narrowband delivery. This solution, however, compromises the quality of the animation as well as, in most cases, the quality of associated audio.

Finally, the possibility of changing animation and/or dialog for a character on a daily or even hourly basis is virtually impossible due to the inherent difficulties and time required to synchronize lip movements and behaviors to dialog. Each of the issues discussed above individually and collectively serve to create a substantial barrier to entry for the acceptance and implementation of animated characters in an Internet environment.

SUMMARY OF THE INVENTION

Accordingly, there is a need for a system and method whereby dynamic animation may be prepared at a reduced cost and without the need for significant specialized skills.

There is also a need for a system and method which may be used to develop flexible dynamic animation which may be easily re-purposed for use in different applications and with different dialogue.

There is additionally a need for a system and method which generates dynamic animation which may be used in a narrowband environment such as the Internet without the need to delete content or compromise quality in order for such animation to be processed on a real-time basis.

The present invention provides these and other advantages in the form of an easy to use tool for preparing animated characters for use on the Internet. Requiring only limited user input and selection, the system of the present invention automatically choreographs and synchronizes reusable animation components with dialog streams. Once generated, the resulting choreography may be embedded into a hypertext markup language (HTML) web page with an appropriate animation player and audio player plug-in to deliver any number of animated dialogues with minimal wait time and minimal developer effort.

In a preferred embodiment of the present invention, the automatic animation preparation system (AAPS) of the present invention includes an animation preparation application which assigns dialog to pre-existing character templates and which automatically generates lip movements and behaviors which are synchronized with streamed audio dialog. The AAPS interacts with a browser control (plug-in) located on the client. The browser control includes an animation engine supporting AAPS generated animation and also supports runtime execution of audio streaming.

It is a principal object of the present invention to provide a system and method for generating character animation for use in an Internet environment and which addresses the shortcomings discussed above.

It is another object of the present invention to provide a tool for automatically generating easily modifiable dynamic animations synchronized with audio content and which may be implemented by embedding such animations in an Internet web page.

In accordance with these and other objects which will be apparent hereinafter, the instant invention will be described with particular reference to the accompanying drawings.

BRIEF DESCRIPTION OF THE DRAWINGS

The foregoing and other objects, features and advantages of the invention will be apparent from the following more particular description of the preferred embodiments of the invention, as illustrated in the accompanying drawings in which like reference numerals refer to like components throughout the different views and illustrations.

DESCRIPTION OF THE PREFERRED EMBODIMENTS

The present invention provides a flexible, convenient and inexpensive method by which dynamic animation may be automatically produced for use in connection with an Internet web page. The AAPS 80 which is disclosed herein and which processes according to the above referenced method is designed to offer a user-friendly, intuitive interface through which animation may be selected, processed, and included within a web page accessible to a user operating a client terminal having access to the generated web page.

Figure 1:
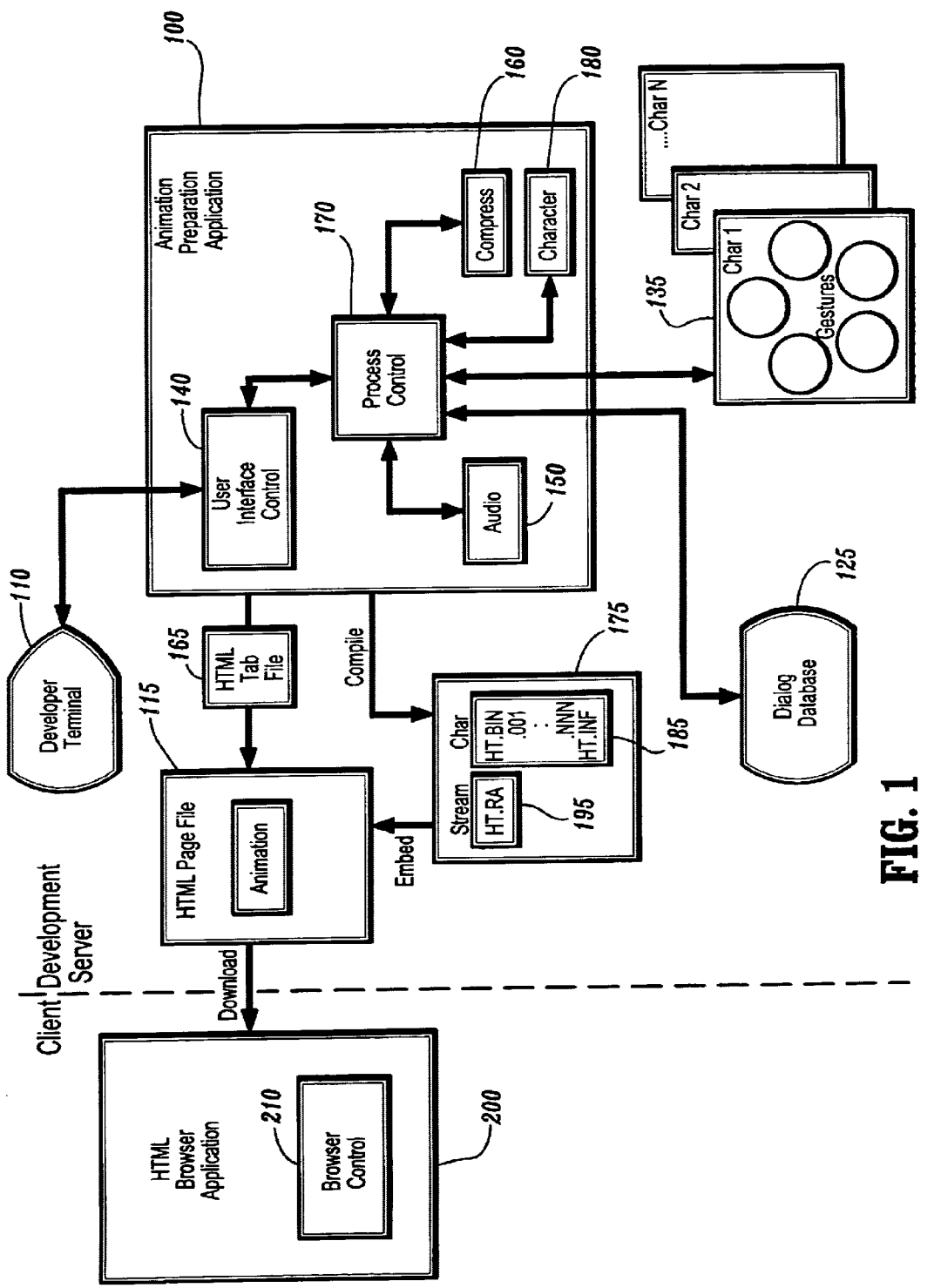
FIG. 1 is a block diagram of the automatic animation preparation system (AAPS) of the present invention and the environment in which it operates.

Referring now to FIG. 1, an explanation of the present system and method for generating dynamic animation is discussed. It should be understood that although FIG. 1 illustrates a client/server environment whereby development occurs on the same server as the resulting real time animation, the invention is not necessarily restricted to such an arrangement. For example, it is also possible for the present system to operate with separate servers for development and storage of generated files. It is also possible for AAPS 80 to exist in a standalone environment, perhaps on a personal computer, with transfer of files to an Internet server accomplished either by modem or copying onto transportable physical storage media.

Returning now to FIG. 1 and the components illustrated thereon, HTML browser application 200 will now be described. Browser application 200 preferably supports either Microsoft Internet Explorer version 3 or 4 or Netscape Navigator version 3 or 4, or any successor product. Browser application 200 further preferably supports one of the following: Microsoft NetShow, VivoActive, VDOLive, Liquid Audio, XING Stream Works and/or RealAudio versions 3, 4 or 5. Browser application 200 also includes browser control 210 for processing animation generated by animation preparation application 100. Browser control 210 is preferably configured as a plug-in application for use with HTML browser application 220 and may always be resident or may be selectively resident as its use is required. In a preferred embodiment of the present invention, browser control 210 is the Topgun player available through $7^{th}$ Level in Richardson, Tex., although browser control 210 may be any animation player application capable of supporting browser application 200 and the animation generated by AAPS 80.

Animation preparation application 100 takes input from various files and developer selections (both discussed below) and generates dynamic character animation as represented by multiple output files (also discussed below). Animation preparation application 100 contains a number of components which collectively generate animation. User interface control 140 interacts with developer terminal 110 so as to allow a developer working at developer terminal 110 to select and process dynamic animation characteristics in accordance with the system of the present invention. In a preferred embodiment of the present invention, user interface control 140 provides a Window's based GUI and operates so that display and processing from the developer point of view operates according to "wizard" applications which step the user through a task and which are now common in the Microsoft Windows environment.

Animation preparation application 100 also includes process control 170 which may incorporate both a physical processor and software or micro code for controlling the operation of animation preparation application 100 including the various components of animation preparation application 100. Animation preparation application 100 further includes various functional processes such as compression functionality 160 (which serves to compress any data processed by animation preparation application 100 if necessary by, for example, encoding PCM wave data into one of a variety of audio formats of various bitrates), audio functionality 150 (which generates audio streaming data for playback at browser control 210), and character processing functionality 180 (which generates animation for playback at browser control 210).

Animation preparation application 100 references character database 135 which preferably resides on secondary storage associated with the development server maintaining animation preparation application 100. Character database 135 contains gesture data for any number of characters which are available to the developer in connection with the use of animation preparation application 100. For each character, a fixed number of gestures associated with that character is also provided. The number of characters stored in character database 135 is preferably on the order of 5–50 characters but any number of characters, subject to storage and implementation issues, may be used.

The system of the present invention further includes dialog database 125. This database is used to store audio clips available for use in connection with animation preparation application 100. It is also possible to provide a microphone or other recording means whereby developer may record additional audio clips either for storage in dialog database for later use or for direct, immediate use by animation preparation application 100.

A brief discussion of the files generated by animation preparation application 100 is now provided. Further detail with respect to each file is provided below. The first file generated by animation preparation application 100 may be referred to as the RealAudio Choreography (RAC) file 138. While the discussion assumes the use of a RealAudio compatible player at the client, the invention may also be practiced with other players and all of the files described below may easily be generated so as to be compatible with other players. The (RAC) file 138 contains lip synchronization information which corresponds to the dialog selected from dialog database 125. This file may be converted, using available tools to generate an event file corresponding to the player employed at the client. In the case of RealAudio, the file is an RAE file and in the case of NetShow, the file would be an Advanced Streaming Format (ASF) file. The event file triggers animation events through browser control 210. Additionally, animation preparation application 100 generates HTML clip file 165 which consists of HTML commands with embedded object references so as to trigger the execution of animation again through browser control 210 and in connection with the aforementioned event file. HTML clip file 165 may be manually pasted into HTML page file 115 in the appropriate location. Animation preparation application 100 also generates either or both a RealAudio (.RA) file 195 (or other audio file) and/or a .WAV file. These files represent the encoded dialog selected from dialog database 125 in a format which may be used by HTML browser application 200 to play audio associated with the generated animation.

A .INF file 112 is also generated by animation preparation application 100. This file includes version information respecting the various files and applications which should be used in playing back animation. Once HTML browser application 200 has received (through an Internet download) .INF file 112, HTML browser application 200 is able to request the correct files (as indicated by the contents of .INF file 112) from the animation server. Additionally, animation preparation application 100 further generates control BIN file 108 which holds a set of pre-compiled character assets and behaviors. In addition to BIN file 108, animation preparation application 100 generates one or more resource segment files 105 which correspond to character models and contain components which may be composited together to form animation.

In using AAPS 80, the developer is prompted through several dialog boxes for character and behavior selection, dialog file import selection and various options to select and generate an animated character for use within an HTML web page. During the process for generating dynamic character animation according to the invention, digitized dialog is automatically analyzed in order to extract phonetic information so that the proper lip positions for the selected character may be assigned. Default choreography may also be automatically assigned by the animation preparation application 100 through an analysis of dialog features such as pauses, time between pauses, audio amplitude and occasional random audio activity. In addition to dialog features, a selected character's inherent personality traits may also be factored into the generation of default choreography. For example, one character may scratch his head while another puts his hands on his hips.

The resulting default choreography is preferably output into RealAudio Character (RAC) file 138 (or other choreography file) (which may be converted to a RAE or other event file) to trigger animation events at the user's computer through HTML browser application 200 and specifically browser control 210. Selected character behaviors and assets are pre-compiled into binary control file (BIN file) 108 and corresponding resource segments 105 for initial installation prior to installation into HTML page file 115. In this way, character assets are protected from piracy and accidental deletion thus reducing support problems due to missing or corrupted source files. An optional security lock may also be implemented so that playback may occur only from a specified URL. Another advantage of pre-compiling characters into segment files 105 is that the resulting animation preparation time when the animation is executed by HTML browser application 200 is significantly reduced. Alternatively, behaviors and assets may be interleaved with the audio stream and processed dynamically.

As a result of processing by animation preparation application 100, a series of HTML tags are generated and placed on the Windows clipboard or saved to HTML clip file 165. These tags contain all the necessary object embedding information and other parameters for direct insertion into a web page as reflected in HTML page file 115. In addition to the HTML tag file 165, the audio stream file 195, the control BIN 108 and the segment files 105 discussed above, animation preparation application 100 also preferably generates ".INF" file 112. ".INF" file 112 contains associated resource files and version information.

The present invention also provides a mechanism for overriding the default animation generated by animation preparation application 100. In some applications, a developer may desire to override default behavior and manually select one or more specific gestures available in character database 135. By way of example, a character may be talking about items in an online store and need to point in the direction of the items—say, to the character's left. In such case, even if the default animation does not provide this result, the developer may easily modify the default animation to meet his or her needs as discussed below. In another case, the character may need to react with specific behaviors based upon user input in a web page or from a Java or Visual Basic (VB) script. Each of these cases is now discussed; the first case referred to as a "static override" and the second case is referred to as "dynamic override".

Static Override Option

The static override option enables the developer to modify choreography file 138 containing the choreography information. The choreography generated by animation preparation application 100 is stored in choreography file 138 and presented as a list of timed gestures or high-level behavior commands such as turn left, walk right or jump in the air, interleaved with timed mouth positions. Using a list of behaviors common to all characters, gestures can be manually added, modified or removed from the linear sequence with any text editor. A simple syntax (discussed below) is preferably used so as to allow for easy identification and modification and so as to allow clear differentiation between gesture commands and mouth position commands. Several additional commands are also supported, including setting user input events (mouse, keyboard) or event triggers for launching web pages or other character animations. Once modified, choreography file 138 can then be used in connection with HTML Page File 115 and be made available for download and execution by HTML browser application 200. Static override may also be accomplished by allowing a user to embed specific commands, as described above, in the dialog file either in place of or in addition to the gesture file.

Dynamic Override Option

In order to dynamically override a character's default choreography, the web developer can issue gesture commands (index parameters to browser control 210 referencing a particular gesture) from a Java or VB script embedded in HTML page file 115. For example, a web page can cause a character to say different things based upon user input or a Java application. In addition, HTML browser application 200, through browser control 210, may issue a variety of callbacks which can be used to trigger Java or VB scripts to handle special cases such as control startup, content download, beginning sequence, end sequence, and control termination. In this way, a Java script can, for example, respond to embedded triggers in the character's choreography stream to drive a parallel synchronous GIF or JPEG slide show next to the character or even a guided tour through a web site.

Animation preparation application 100 preferably includes a set of pre-produced characters, including, for example, salespeople, teachers, web hosts and other "alternative" choices. These pre-produced characters and their associated gesture set are stored in character database 135. Each character in a preferred embodiment of the invention has exactly the same number and type of basic gestures with each gesture composed of approximately the same number of animation "cels". For purposes herein, the term "cel" refers to an individual image used as part of a sequence of images to create animation. A "cel" may be thought of as a frame in an animation sequence. Within character database 135 each character may have entirely different characteristics possibly making no two characters in character database the same. Nevertheless, conforming the character's "animation architecture" (i.e. same number and type of gestures and each gesture composed of approximately the same number of cels) provides a basis for the generation of automatic choreography by animation preparation application 100 according to the teachings of the present invention.

Since all characters in character database 135 preferably share a common set of behaviors, the end-user using HTML browser application 200 can set a pre-installed character to be their "personal web host" for use with all web pages based upon animation preparation application 100 generated HTML thus obviating the need for repetitive character download to the end-user. This may be effected by a user by, for example, right clicking on a given character in a web page and setting the "Personal Web Host" flag in the object menu. It is also possible for the developer, using animation preparation application 100 to override the user set flag and enforce download of a specific character.

A character can be relatively small, ranging in download size from 15K to 50K depending upon the level of sophistication and detail required or desired. In fact, in one embodiment of the present invention, each gesture for each character may reside in a separate "segment" file which may be downloaded progressively over time to create a "better than bandwidth" experience. For instance, three dialogs could be created for a character where the first dialog uses a small model (15K), the second dialog uses a medium model (20K) containing all of the gestures of the small model as well as some additional gestures and a third dialog (40K) which includes yet some additional gestures. After downloading one or more of these models (gesture sets) they are available for use by HTML browser application 200 without any further download to the client. In this way, dialogs and dynamic animation may be implemented such that very expressive sequences can be created despite any bandwidth limitations. Alternatively, the character models may be made available to the client through the distribution of a CD-ROM, other transportable storage medium or preloaded on a computer hard drive. In this way, a user may be provided with large character databases and attributes without the need to wait for download. Choreography control information may either be delivered prior to initiation of the audio stream or embedded and streamed with the audio for interpretation "on the fly". In the latter case, callbacks may be made dynamically on the client to trigger lip movements and gestures.

Since each character is actually dynamically composited from a collection of parts such as body, arms, head, eyes and mouth layers, redundant animation cels are eliminated and therefore do not need to be downloaded. In other words, once the body parts necessary to perform the desired animation have been downloaded to the end-user client, animation sequences may be created through the use of animation preparation application 100 with reference to the body parts resident on the client for playback without any real-time download.

Additionally, body parts can be positioned, timed and layered in a seemingly endless number of combinations to correspond to the desired dialog by subsequently downloading a very small control file (BIN file) 108 which is typically only a few thousand bytes. The control file 108 need only reference body parts and positions already resident on the client to reflect the desired animation which is produced by animation preparation application 100.

In a preferred embodiment of the present invention a standard Windows Help file is included as a component of the animation preparation application 100. The Help file preferably contains in-context information describing options for each selection screen as well as tutorials and examples explaining how to manipulate default character behaviors including the use of both static and dynamic overrides as discussed above.

Figure 2:
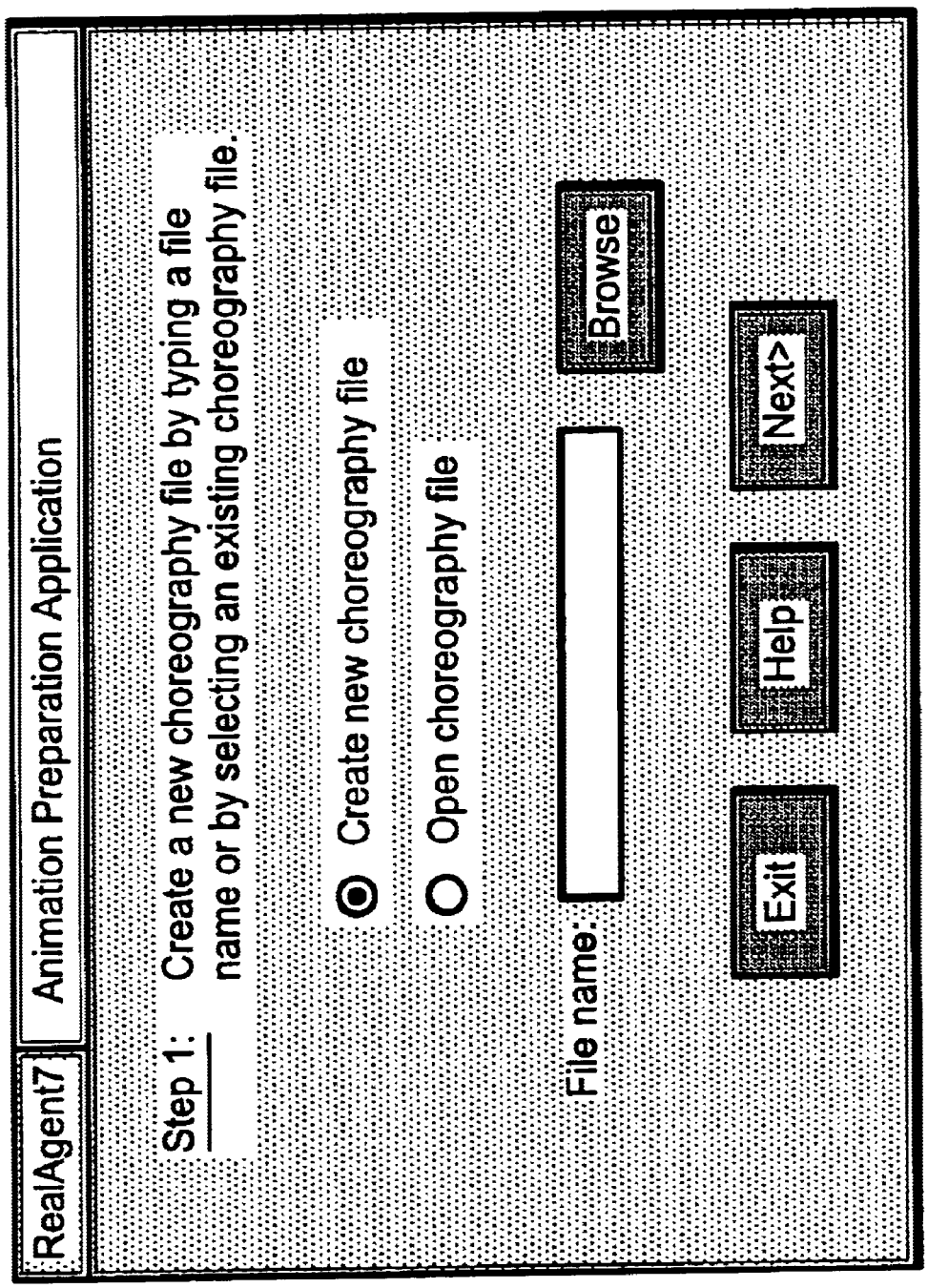
FIG. 2 is an illustration of an exemplary first dialog box used in connection with the AAPS according to the teachings of the present invention.

Turning now to FIGS. 2–5, a detailed description of the operation of the animation preparation application 100 is now provided from both a user point of view as well as with respect to internal processing steps. FIG. 2 illustrates an example of a wizard dialog box that may be employed by animation preparation application 100 and specifically generated by user interface control 140 in the first step of the process for generating automatic dynamic animation. The first dialog box prompts the developer to select between automatically creating new choreography or using existing choreography. In a preferred embodiment, the developer selects among these choices through "radio buttons". In the default case of automatic creation, the developer proceeds to the second dialog box. In the case where the developer selects use of an existing choreography file, a Browse button becomes active to provide another dialog box for finding and selecting a previously generated choreography file. Again, after this selection, the developer proceeds to the second dialog box. Preferably, at the bottom of the dialog box, the buttons Help, Exit and Next are displayed. The Help file can offer the developer context specific help with respect to the first dialog box.

Figure 3:
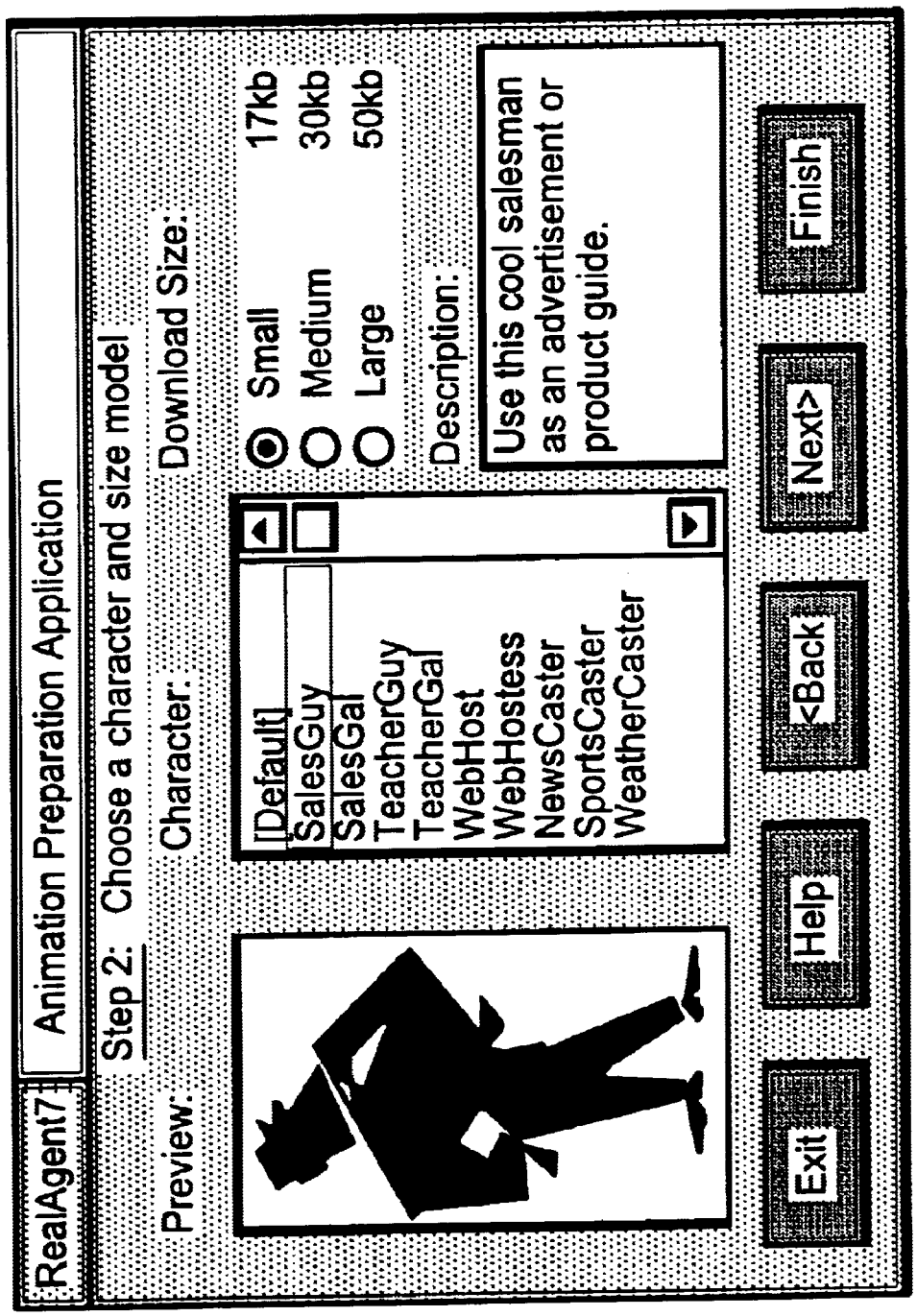
FIG. 3 is an illustration of an exemplary second dialog box used in connection with the AAPS according to the teachings of the present invention.

The second dialog box is depicted in FIG. 3. This box prompts the developer for selection of a character name through the use of a list box and provides a thumbnail image representative of each character when selected. In addition, three radio buttons are preferably included allowing the user to select among a small, medium or large model for each character. As discussed above, the character model limits or expands the number of gestures available for the selected character and may be selected as a tradeoff between download speed and animation richness. Once a character and gesture level (model) are selected by the developer, the fully compressed download size for the selected character/model combination is displayed in order to assist the developer in his or her selection.

Additionally, at the bottom of the dialog box, the Help, Exit, Back, Next and Finish are provided. The Next button is grayed and the Finish button active only when the developer has selected the use choreography file option through the first dialog box. In this way, the developer can optionally choose a different character for use with a pre-existing or modified choreography file 175 before again using animation preparation application 100 to automatically generate animation. In all dialogs, Back returns the developer to the previous dialog box and Finish incurs any remaining defaults and then completes the preparation of dynamic animation and all files associated therewith.

Figure 4:
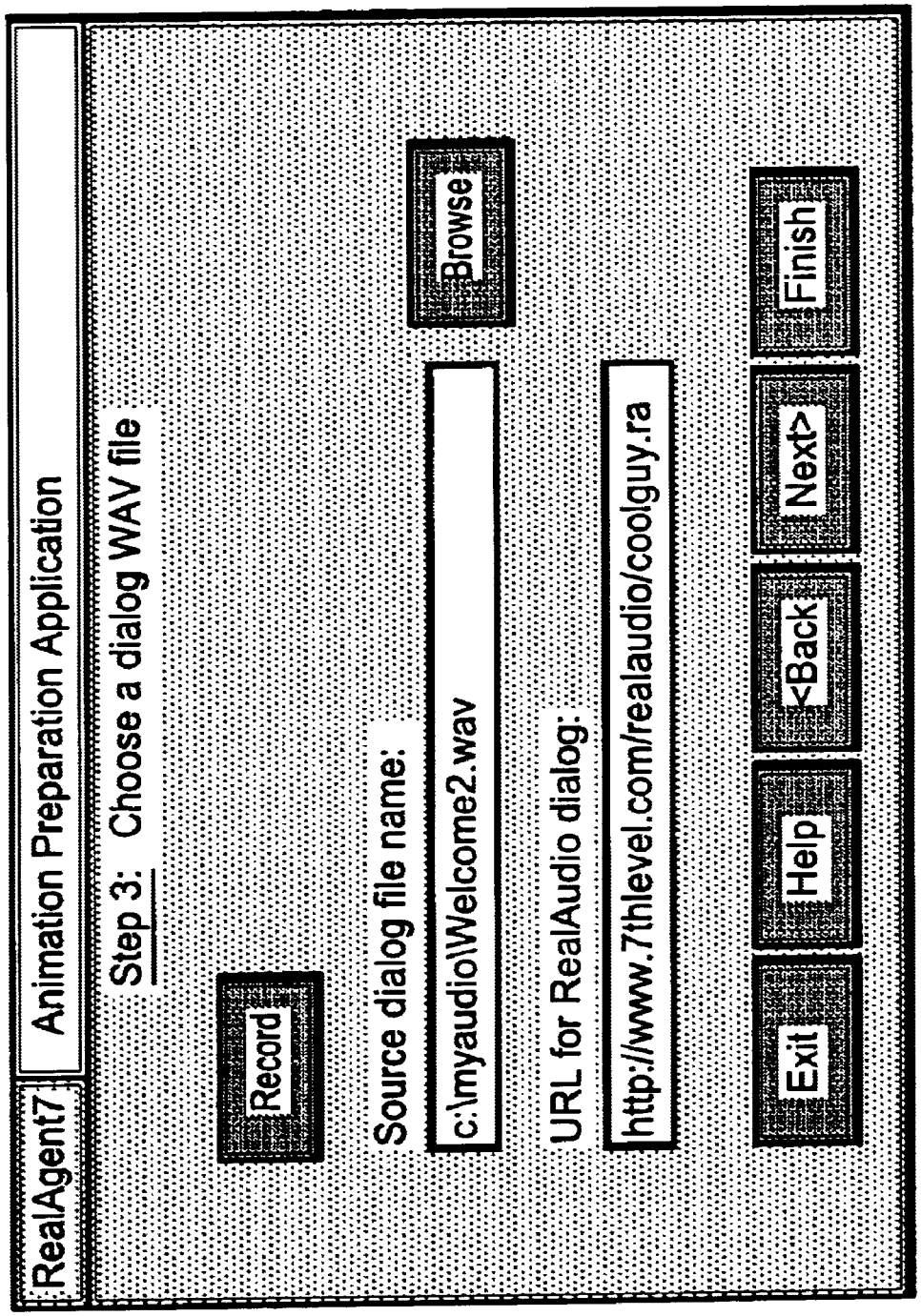
FIG. 4 is an illustration of an exemplary third dialog box used in connection with the AAPS according to the teachings of the present invention.

The third dialog box, which is illustrated in FIG. 4, is used to prompt the developer to select a source .WAV audio file as well as providing the ability to browse for an audio file or record a new one. The third dialog box may include a Preview button (not shown) in order to allow the developer to hear a selected audio file. The selected audio file preferably contains spoken dialog without background sound or noise which would make phoneme recognition difficult, even though it is possible for the resulting RealAudio file 195 or .WAV file 195 to contain music, sound effects and/or other audio.

An edit box is also provided for entry of the URL pointing to the encoded RealAudio file 195 or .WAV file 195 which is generated by animation preparation application 100. The entered URL is also used by animation preparation application 100 to generate .INF file 112 and HTML tag file 115. It is also possible to include an input field in the third dialog box whereby the user may enter text corresponding to the recorded dialog to ensure that lip synchronization is accurate. An option may also be included whereby the developer can select a specific bit-rate with which to encode the audio. Encoding according to a specified bit-rate may be accomplished through the use of the RealAudio Software Development Kit (SDK) or other development tools corresponding to other players. Finally, the third dialog also includes Exit, Help, Back, Next and Finish buttons which operate the same way as discussed above.

Figure 5:
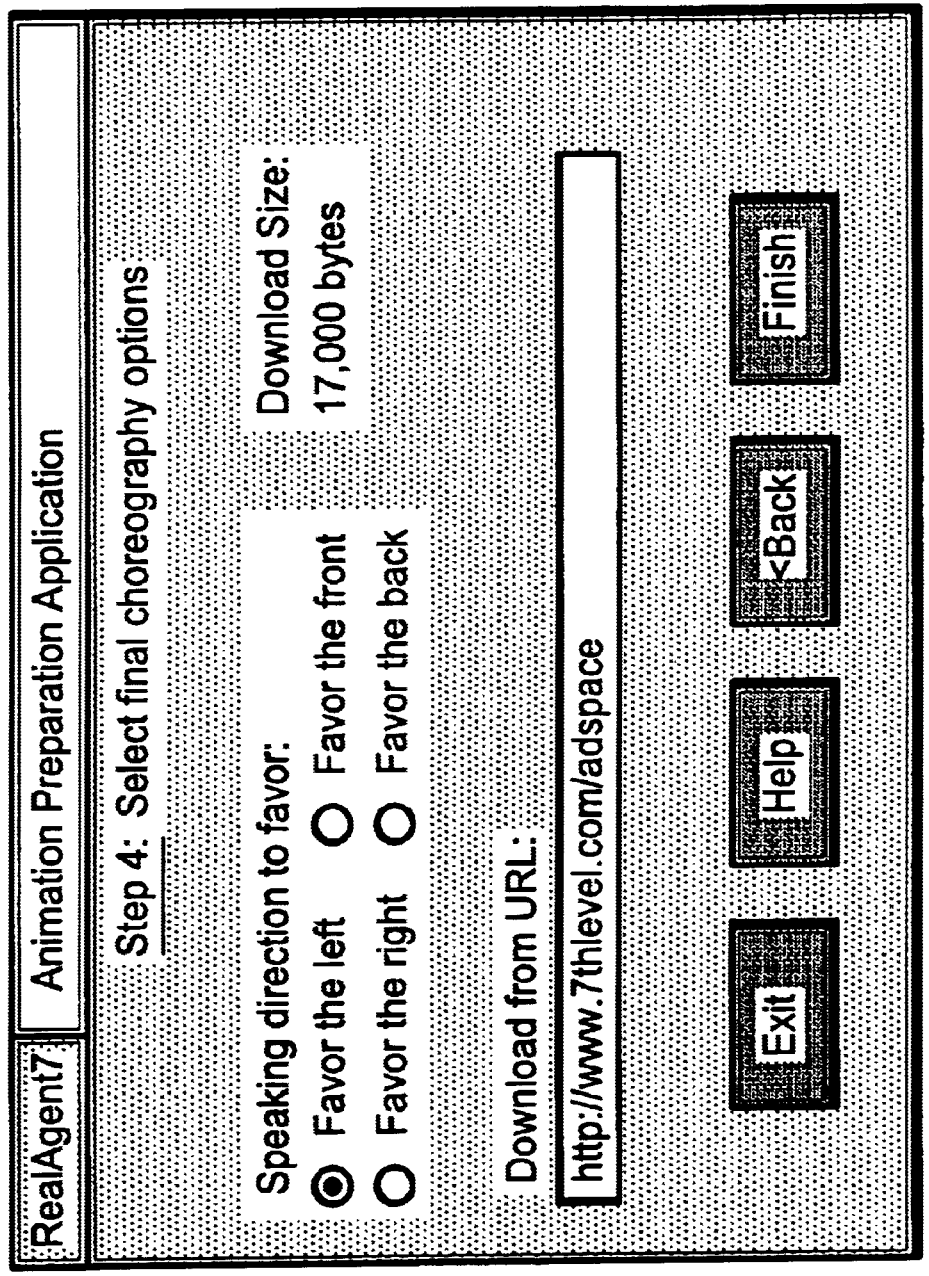
FIG. 5 is an illustration of an exemplary fourth dialog box used in connection with the AAPS according to the teachings of the present invention.

The fourth dialog box is illustrated in FIG. 5. This dialog is processed upon completion of the third dialog. The fourth dialog box prompts the developer for choreography options using four mutually exclusive radio button options: FAVOR_LEFT, FAVOR_FRONT, FAVOR_BACK, and FAVOR_RIGHT. Each of these options will cause animation preparation application 100 to tend towards selection of gestures and high-level behaviors which cause the character to orient toward a particular area of the web page or specific orientation with respect to the user. It will be understood that the above four options are provided by way of example only and many other options might be provided either in addition to or instead of the four options above. In other words, the options may reflect any particular behavior of the character which is preferred by the developer so long as the appropriate processing to accomplish the tendency is built into animation preparation application 100.

The options are employed in connection with characteristics in the selected audio file as well as randomization techniques (discussed below) in order to automatically choreograph the character. In addition, an edit field may be provided for the developer to enter a URL from which all character content should be retrieved at runtime. This URL may be different from the location of the audio files and is used as a security lock as discussed above. Again, at the bottom of the dialog box, the Help, Exit, Back and Finish buttons are provided. After the developer has completed the fourth dialog (or selected Finish in an earlier dialog), animation preparation application 100 has all of the information which it needs to automatically generate dynamic information for insertion into a web page.

As a result of the processing by animation preparation application 100, choreography file 138 is generated. This file may be converted to an event file using, for example, Real Network's WEVENTS.EXE in the case of a RealAudio RAC File. RAC file 138 contains both a reference to the audio file and to a list of timed gestures in a "Gesture List" represented by segment files 105. In the default case, RAC file 138 is hidden from the developer and automatically compiled for use with character assets contained in BIN control file 108. The segment files 105 and BIN control file 108 may be collectively compiled for immediate use in connection with HTML Page File 115. Alternatively, the developer may choose to edit the gestures in the segment files 105 in order to manually control character behavior as discussed above.

The RAC file 138 contains a series of references to gestures which are contained in the segment files 105. Each gesture reference is represented in RAC file 138 as a function call with two parameters: gesture number (constant identifier) and duration. An example of a RAC file with a set of gesture references might be as follows:

```
GestureList
begin
   . . .
      Gesture(ARMS_UP, 2000)
   . . .
end.
``` where ARMS_UP is a command to move the character's arms upward and 2000 is the total time allocated to the gesture in milliseconds. In this case, if the actual animation required only 500 milliseconds to execute, then the character would preferably be disposed to hold the ARMS_UP position for an additional 1500 milliseconds. The use of a single entry point for gestures, rather than a different entry point for each gesture provides an open model for forward and backward compatibility between supported gestures and future streaming and control technologies.

The gesture list contained in RAC file 138 is automatically serviced by browser control 210 based upon callback events generated by browser control 210. Each gesture, mouth and event commands are interpreted by browser control 210 in real time, causing the animation to play synchronously with the audio stream and external event messages broadcast (i.e. dynamic override events from user/JAVA control).

By way of example, the developer may desire that the character point to a book image on the character's left at the moment when the dialog says ". . . and here is the book that you have been looking for." This action could be accomplished by changing an "ARMS_UP" gesture parameter to "ARMS_LEFT". If the developer wanted the new gesture to hold longer, subsequent gesture parameters could also be changed or simply deleted and duration parameters adjusted to maintain synchronization with the dialog that follows.

This adjustment is illustrated as follows. Assuming that automatic generation by animation preparation application 100 generated the following:

```
GestureList
begin
    ...
    Gesture(ARMS_UP, 2000)
    Gesture(ARMS_DOWN, 500)
    Gesture(EYES_BLINK, 1000)
    Gesture(ARMS_CROSS, 3000)
    ...
end
```

The following represents manual modification to achieve the desired result:

```
GestureList
begin
    ...
    Gesture(BODY_LEFT, 1000)
    Gesture(ARMS_LEFT, 3000)
    Gesture(EYES_BLINK, 2500)
    ...
end
```

In the margin next to the gesture commands, phonetic information may be added as comments (using a predetermined delimiter) to help identify spoken dialog and timing.

In the typical case, there are six mouth positions used to express dialog. The mouth positions and duration are also written to RAC file 138 as a list of commands interleaved with the gesture commands. For example, mouth positions in RAC file 138 may be represented as follows:

```
array GestureList
begin
    ...
    Gesture(ARMS_UP, 2000)
        Mouth(LIP_A, 250)
        Mouth(LIP_C, 350)
        Mouth(LIP_B, 250)
        Mouth(LIP_A, 450)
    Gesture(ARMS_DOWN, 500)
    ...
end
``` where LIP_A, LIP_B and LIP_C represent particular mouth positions and the number following the position is the length of time such mouth position is held. It should be noted that the generic mouth positions indicated must be converted into logical/physical mouth positions dynamically to correspond to the gesture pose in effect at any moment. In the above example, the mouth positions A, C, B, A should be changed into specific bitmaps depending on which gesture is being displayed, and composited onto the other character layers. This is discussed in greater detail below.

For each character, a mapping of phonemes to lip positions is also necessary to account for differences between character personality features. This map file should be included with each character's assets and used to convert recognized phonemes into appropriate mouth positions.

In a preferred embodiment of the present invention there are on the order of and preferably at least ten characters (and their associated gestures) in character database 135 for use by animation preparation application 100. Each character is preferably produced to a template—gesture for gesture. The template is set up to be general purpose and to include by way of example the following basic gestures:

| | |
|---|---|
| 1) Face Front | (mouth positions active) |
| 2) Face Left (flip for Face Right) | (mouth positions active) |
| 3) Face Rear Left (flip for Face Rear Right) | (mouth positions active) |
| 4) Foreshorten to Camera | (mouth positions active) |
| 5) Walk Cycle Left | |
| 6) Arms Down | |
| 7) Arms Up | |
| 8) Arms Left (flip for Arms Right) | |
| 9) Arms Cross | |
| 10) Arms Out (to implore or stop) | |

As would be understood by one of ordinary skill in the art, other gestures may be added or substituted for the above gestures. In addition, each locked head position should have the standard six mouth positions as well as eye blinks and common eye emotions such as eyes questioning, eyes concentrating, and eyes happy. All gestures can be animated forward or backward to central hookup position(s). Each character, as discussed above, preferably has small, medium and large size versions of a given gesture which utilize less to more cels. In addition, each pose which has active mouth positions preferably includes a corresponding set of planned behaviors and timings. This is discussed in further detail below.

There are several key elements which make automatic and dynamic choreography of characters possible using browser control 210 and animation preparation application 100:

1. Audio encoding SDK integration;
2. Automatic phoneme recognition;
3. Browser control 210 script language and compiler;
4. Templated character gestures;
5. Gesture asset segmentation;
6. Behavior generation (scene-planned gestures); and
7. Dynamic Control of Gestures Each one of these key features is now discussed.

RealAudio SDK (or Alternative SDKs)

Although the following description relates to the use of the RealAudio player SDK, it will be understood that the present invention may alternatively employ any of the following or similar SDKs: NetShow, VDO, VivoActive, Liquid Audio or XING Streamworks.

The RealAudio player SDK should be used as necessary to provide audio streaming at various bit-rates and to maintain synchronization of character animation with audio stream file 195. Character choreography is delivered via RAC file 138, which is automatically created by animation preparation application 100 and which may be converted to a RealAudio event file (or similar event file).

Automatic Phoneme Recognition

Speech recognition and emotive libraries and source code may be employed to provide automatic phoneme recognition using, for example, Voxware, VPI or AT&T Watson software. In addition. any SAPI compliant text-to-speech processor (such as Lernout & Hauspie's TrueVoice may be used to process dialog text (entered into animation preparation application 100) into phonemes for greater precision in synchronizing mouth positions to a dialog stream. In the event that a SAPI compliant processor is not installed, a dictionary providing mappings from common words to phonemes may be used. Browser control 210 is also preferably configured to provide mapping of the 40 phonemes onto one of 6 mouth positions. However, the map in this case should be intrinsic with each character in that some characters may have different or more or less mouth positions.

Templated Character Gestures

All characters preferably share the same number and type of basic gestures and the same number and type of scene-planned behaviors, but do not necessarily require the same number of animation cels.

Each character's possible gestures and behaviors are "queues" contained in it's own browser control 210 include file. These queues are character specific animation commands, including logical cel names and hold counts. This method frees the artist to use as many cels as desired to express the character for each basic gesture or composite behavior. In addition, new or replacement gestures can be added in the future without concern for backward compatibility in browser control 210.

Gesture Asset Segmentation and Version Control

Character assets (bitmaps) for each basic gesture are compiled into a separate segment file 105 to enable separate downloading based on the size model selected (i.e., small, medium or large). For the small model, only a few gesture bitmaps and queues are needed. For the large model, all of the queues and bitmaps are necessary. Segmenting each basic gesture into it's own segment file 205 enables selective downloading of assets. In this way, gestures can be accumulated in three successive dialog streams to create a "better than bandwidth experience".

All characters and content are made compatible with future browser control versions by locking subsequent browser control commands' entry points in the runtime interpreter. New commands may simply be appended to support newer features. Old browser controls should also support newer content by simply ignoring new gesture commands.

For versioning between server and client, .INF file 112 is used to identify client browser control 210 version and versions of any resource segment files 105 or necessary plug-ins.

Behavior Generation

Automatically generating choreography from a set of gestures requires both a library of scene-planned behaviors and several input parameters. As discussed above, each character has small, medium and large size versions (as well as other possible sized versions) of a given gesture and each pose having mouth positions has a set of planned behaviors and timings.

For instance, the FACE_FRONT behavior in medium model might have five versions, each lasting approximately 2000 milliseconds which can be applied automatically in any combination to fill time available until the next gesture trigger. It follows that, in this case, there would be 3 sizes×5 behaviors=15 possible behavior queues for FACE_FRONT. In general, browser control 210 selects one or more of the behavior queues for a given size model to fill the time to the next behavior trigger. These options can be driven by browser control 210 using the following table:

| FACE_FRONT Behavior Table | | | |
|---|---|---|---|
| | \ small | medium | large |
| SILENCE | FF1S[] | FF1M[] | FF1L[] |
| SPEAK_SOFT | FF2S[] | FF2M[] | FF2L[] |
| SPEAK_LOUD | FF3S[] | FF3M[] | FF3L[] |
| SPEAK_SHORT | FF4S[] | FF4M[] | FF4L[] |
| SPEAK_LONG | FF5S[] | FF5M[] | FF5L[] |

Each of the entries in the above table can either be a pointer to another table or simply another table dimension containing several variants of each behavior row. For instance, the SPEAK_LOUD row, medium model column entry FF3M[ ] might have the following 3 scene-planned behaviors composed of primitive gestures:

| FACE FRONT, SPEAK LOUD. Medium model |
|---|
| FF3MA FACE_FRONT, EYES_BLINK, ARMS_UP, ARMS_DOWN |
| FF3MB FACE_FRONT, ARMS_UP, ARMS_DOWN, HAND_POINT |
| FF3MC FACE_FRONT, HAND_POINT, EYES_BLINK, ARMS_UP |

In this way, selection of gestures and high-level behaviors are based on a combination of user options, gesture triggers and randomization. For example, the second entry in this table, FF3MB, might be generated as follows:

```
array GestureList
begin
...
Gesture(FF3MB,      ; FACE_FRONT_2, SPEAK_LOUD, medium
15000)              model, 2nd
                    ; version randomly selected.
...
end
```

In this example, browser control 210 would have 15 seconds of time to fill before the next gesture trigger. To fill this time with action, the behavior duration is adjusted automatically by browser control 210 by varying the hold value for the last cel of each gesture in the behavior. The additional hold values can be calculated as a randomized percentage of the required duration minus the cumulative gesture animation times. Whenever a duration exceeds some prescribed length of time (per artist) without encountering a gesture trigger, browser control 210 selects another random entry for the same criteria (say, FF3MC) and adds this to the gesture list.

Each character may have 10 basic gestures with 4 of these poses having 6 mouth positions. In addition, all characters may share the same 45 scene-planned behaviors. However, additional entries can be scene planned to create more variety in behavior if needed. During any significant period of silence or at the end of a dialog stream, browser control 210 preferably always places the character into an ambient wait state which cycles through various randomized gestures. This is indicated by the command Gesture(FF_WAIT,−1).

Interactive Controls

Several additional commands may be made available for manual insertion into the gesture list. These commands cause event triggers based on user input, including mouse browse, mouse click and keyboard input.

To handle keyboard, mouse or browse events, the developer might insert the commands:

| | |
|---|---|
| Key | (<COMMAND_NAME>,<DURATION>) |
| Mouse | (<COMMAND_NAME>,<DURATION>) |
| Browse | (<COMMAND_NAME>,<DURATION>) | at any point in the gesture list to cause a particular gesture or URL link to occur immediately. The assumption is that all events relate to a single character, so a character name parameter is not necessary. The COMMAND_NAME may be either a basic gesture, high-level behavior or text string containing a URL. The DURATION applies only to gestures or behaviors and can be either a specific period of time in milliseconds or −1 (LOOP constant) to indicate infinite loop.

For example, browsing a character might cause it to point to a banner ad in the web page. Alternatively, the command could be a text string containing a URL linking to another web page (causing a launch of that page) or a URL to a dialog control file to retrieve and launch. The control file URL points to .INF file 112 describing content and/or control file to retrieve and initiate. If all files are already cached on the client, then control file 108 is processed immediately to stream the desired dialog. This format is extensible to support a variety of other commands or conditions in future versions.

Dynamic Mapping of Gestures

At times, a developer may wish to cause specific character actions to occur under the control of HTML, Java, VB Script or server CGI script. In the case of HTML, different characters and dialogs are launched by passing .INF file 112 URL as a parameter to browser control 210. To launch a new dialog, the HTML simply needs to set the parameter to the desired content to cause it to begin streaming. This is accomplished either upon loading of the web page or is based on logic contained in embedded Java or VB script. Using embedded Java or VB script logic, events triggered from user input or built-in logic conditions can launch different character dialogs.

In addition to launching specific character dialogs from embedded script, a mechanism is provided for triggering specific character gestures or behaviors. Numeric values may be passed into browser control 210 corresponding to each of the supported gestures and behaviors, causing that action to be performed. For instance, a fragment of Java code in an HTML page can call browser control 210 with the parameter "2" (corresponding to the FACE_LEFT gesture command) to cause the character to unconditionally animate to face left. The Java fragment may be called from other Java script processing mouse events for a button or picture. In fact, entire applications can be written in Java or VB to create any number of control programs for characters.

There is no significant problem triggering a different gesture than the one currently executing, other than a possible "snap to position" that would occur if the character was in a non-hookup state. The potential difficulties involve dynamic selection of mouth positions for a given pose and the possibility of falling out of synch with the dialog stream.

The design of the present system accounts for the dynamic mapping of mouth positions to gestures. The present system assumes that the two are maintained separately, lips z-ordered above gestures in the proper position, and played together at runtime by browser control 210. To support dynamic mapping of mouth positions, a method must be provided to process gesture requests—either from the gesture list or through a dynamic gesture request—and automatically select and composite the mouth position cels corresponding to the current gesture ANIMATE queue command. More specifically, since the gesture list and mouth positions list generate asynchronous requests, a mechanism must service the requests, composite them and animate them in real time.

The solution to "falling out of synch" lies in remembering where the character should be in time synchronous with the continuing dialog stream. Browser control 210 handles this by holding the last cel of the interrupting gesture as needed and jumping to the next gesture in time in order to catch back up with the gesture list and dialog stream. If this case is not handled, it is likely the animation will remain out of synch for the remainder of the dialog.

Another issue that arises when dynamic override of a character's choreography occurs is the possibility of triggering animation which does not have mouth positions associated with it. It is the responsibility of the developer to take this possibility into account and not trigger a move which would not have mouth positions associated. Given the choice of gestures or behaviors which have mouth positions, browser control 210 is likely able to dynamically select the correct mouth positions synchronous to the audio stream as it would normally do for any pre-produced gesture.

While particular embodiments of the present invention has been described and illustrated, it should be understood that the invention is not limited thereto since modifications may be made by persons skilled in the art while still falling within the scope and spirit of the appended claims.

We claim:

1. An automatic animation generation system comprising:
   a developer terminal:
      a character database containing data representative of at least one character having limbs and a mouth and a limited number of different gestures and mouth positions associated with each such character, said gestures including different movements of the character's limbs;
      an animation preparation application, said animation preparation application in communication with said developer terminal and said character database and said animation preparation application generating a plurality of output files representative of animation;
      said output files including commands specifying movements of the character's limbs by identifying the limbs involved in the movements and the nature of the movements, and further specifying time durations associated with the respective movements, including automatically assigned movements of the character's limbs using analysis of dialog features;
      said character database being responsive to said commands to generate an animation sequence comprising the movements and taking into account the durations specified by said commands;
      a choreography file containing lip synchronization information; and
      a dialog processor analyzing dialog and automatically assigning default choreography said dialog processor being responsive to dialog provided thereto to access the choreography file and the character database and select therefrom gestures and mouth positions in accordance with the provided dialog.

2. The automatic animation generation system of claim 1 wherein said animation preparation application further comprises a user interface control for processing a graphical user interface for display on said developer terminal.

3. The automatic animation generation system of claim 1 wherein said output files reside on an animation server and are accessible by a client in order to allow said client to execute said animation.

4. The automatic animation generation system of claim 1 wherein said animation preparation applications generates said animation dependent upon developer input, one or more stored audio files and the data contained in said character database.

5. The automatic animation generation system of claim 1 wherein at least one character model having character attributes is transmitted to a client for executing said animation.

6. A system as in claim 1 including a source of high level behavior commands, wherein said dialog processor is responsive to said high level behavior commands to modify said default choreography.

7. A method of preparing character animation sequences comprising:

storing a character database containing data representative of at least one character and of a limited number of gestures associated with the character, said character having limbs and a mouth, and said gestures including different positions of the limbs and of the mouth;

providing commands specifying respective positions of the character's limbs and time durations associated with the respective positions of the limbs;

supplying a dialog file representing speech by the character;

applying the commands to the database and to the dialog file to produce output files representing animation sequences involving movements of the character's limbs and mouth synchronized with said speech, including limb choreography automatically assigned in response to features of said speech;

responding to dynamic inputs while displaying the animation sequences to change the animation sequences being displayed in a selected manner related to the dynamic input.

8. A method as in claim 7 including selectively providing high level behavior commands modifying the gestures in said animation sequence.

* * * * *